(12) United States Patent
Bonn et al.

(10) Patent No.: US 9,942,766 B1
(45) Date of Patent: Apr. 10, 2018

(54) CALLER VALIDATION FOR END SERVICE PROVIDERS

(71) Applicant: Sprint Communications Company L.P., Overland Park, KS (US)

(72) Inventors: Mark J. Bonn, Granite Bay, CA (US); Cory A. Yang, Fremont, CA (US); Gerald Ray Jordan, Jr., Kansas City, KS (US); Dominick Mangiardi, Fremont, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/828,165

(22) Filed: Aug. 17, 2015

(51) Int. Cl.
 *H04M 1/66* (2006.01)
 *H04W 12/12* (2009.01)
 *H04M 3/42* (2006.01)
 *H04W 8/26* (2009.01)

(52) U.S. Cl.
 CPC ....... *H04W 12/12* (2013.01); *H04M 3/42059* (2013.01); *H04W 8/26* (2013.01)

(58) Field of Classification Search
 None
 See application file for complete search history.

(56) References Cited

U.S. PATENT DOCUMENTS

| | | | | |
|---|---|---|---|---|
| 8,060,069 | B1* | 11/2011 | Lai | H04M 3/42365 370/493 |
| 2002/0090074 | A1* | 7/2002 | Sbisa | H04M 3/60 379/221.09 |
| 2004/0120491 | A1* | 6/2004 | Colson | H04M 3/42229 379/207.02 |
| 2007/0061211 | A1 | 3/2007 | Ramer et al. | |
| 2007/0202874 | A1* | 8/2007 | Shon | H04W 4/06 455/433 |
| 2013/0171988 | A1* | 7/2013 | Yeung | H04W 8/12 455/432.1 |

FOREIGN PATENT DOCUMENTS

WO   1993021720 A1   10/1993

\* cited by examiner

*Primary Examiner* — Shantell L Heiber

(57) ABSTRACT

Examples disclosed herein provide systems, methods, and software to validate calls to end telephone numbers. In one implementation, a method of operating a call state service includes obtaining and storing call state information for one or more communication in at least one data structure. The method further provides receiving a call state request for a communication of interest, wherein the request includes relevant call state information. The method also provides determining whether the relevant call state information matches a communication in the one or more communications based on the at least one data structure, and, if a match is identified, returning a call state match notification to the requesting end service.

15 Claims, 7 Drawing Sheets

CALL STATUS DATA STRUCTURE 600

| DEVICE IDENTIFIERS 610 | CONTACT IDENTIFIERS 620 | CALL TIMES 630 |
|---|---|---|
| DEVICE | CONTACT | VALUE |
| DEVICE | CONTACT | VALUE |
| DEVICE | CONTACT | VALUE |
| DEVICE | CONTACT | VALUE |
| DEVICE | CONTACT | VALUE |
| DEVICE | CONTACT | VALUE |
| DEVICE | CONTACT | VALUE |

FIGURE 6

CALLER VALIDATION FOR END SERVICE PROVIDERS

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services.

In some communication systems, wireless communication networks may facilitate communications between the wireless devices and end services, such as toll free numbers for companies, organizations, and the like. These end services may receive a large quantity of calls from various devices, which require resources to service each of the communications. However, in addition to the communications from real wireless devices, the end services may also receive communications from impersonated devices that use voice over internet protocol (VOIP) and other similar solutions to impersonate an originating phone number and name of a real user. This requires the end services to expend resources on processing the impersonated communications, rather than providing the resources to legitimate calls from wireless devices.

Overview

Examples herein provide enhancements for verifying communications to end contact services, such as toll free numbers. In one example, a method of operating a call state service to manage call state information for a wireless provider network includes obtaining the call state information for one or more communications, and storing the call state information in at least one data structure. The method further provides receiving a call state request for a communication of interest from a contact service, and identifying relevant call state information for the communication of interest. The method also includes determining whether the relevant call state information for the communication of interest matches a communication in the one or more communications based on the at least one data structure. If the relevant call state information for the communication of interest matches a communication in the one or more communications, the method provides returning a call state match notification to the contact service.

BRIEF DESCRIPTION OF THE DRAWINGS

FIG. 6 illustrates a call status data structure to maintain call state information for a wireless network.

DETAILED DESCRIPTION

Figure 1:
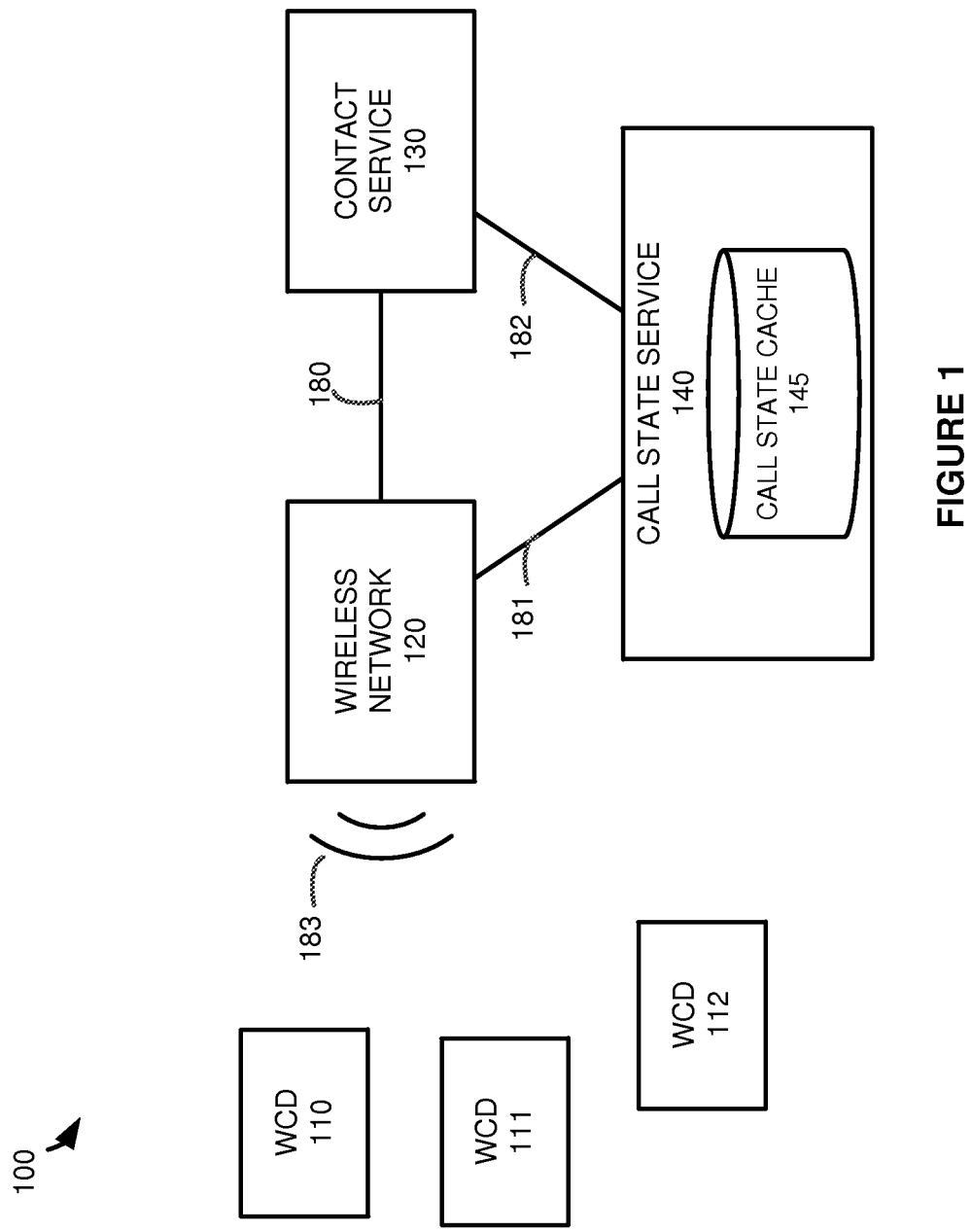
FIG. 1 illustrates a communication system to manage call state information for communications in a wireless network.

FIG. 1 illustrates a communication system 100 to manage call state information for communications in a wireless network. Communication system 100 includes wireless communication devices (WCDs) 110-112, wireless network 120, contact service 130, and call state service 140. Wireless network 120, which corresponds to a wireless service provider, provides wireless signaling 183 to WCDs 110-112. Wireless network 120 communicates with contact service 130 via communication link 180, and further communicates with call state service 140 via communication link 181. Contact service 130 further communicates with call state service 140 via communication link 182.

Contact service 130 may represent a call center, a business, or some other individual or end organization capable of receiving calls from WCDs 110-112. Contact service 130 may comprise an organization associated with a toll free number (TFN) or numbers that allow individuals to contact the system for various purposes including, but not limited to, technical support, purchasing information, billing, or any other similar purpose.

In operation, calls are initiated by WCDs 110-112 over wireless network 120 to communicate with personnel, or automated services associated with contact service 130. To identify these communications, call state service 140 is provided that is used to cache and organize information about the calls in call state cache 140, which corresponds to one or more data structures capable of managing the call states of the individual communications. In addition to legitimate calls placed between WCDs 110-112 and contact service 130, in some implementations, one or more communications directed at contact service 130 may comprise impersonated communications that appear to be from legitimate devices.

Here, to assist contact service 130 in identifying legitimate communication requests to the service, contact service 130 may communicate with call state service 140 to identify the legitimate communications. In particular, call state cache 140 maintains call state information for calls placed over wireless network 120 to contact service 130. This call state information may include an identifier for the device making the call, such as a telephone number associated with the device, the time that the call took place, and the TFN or other identifier for the end contact service. Contact service 130 may then query the call state information to determine whether a communication is legitimate.

Figure 2:
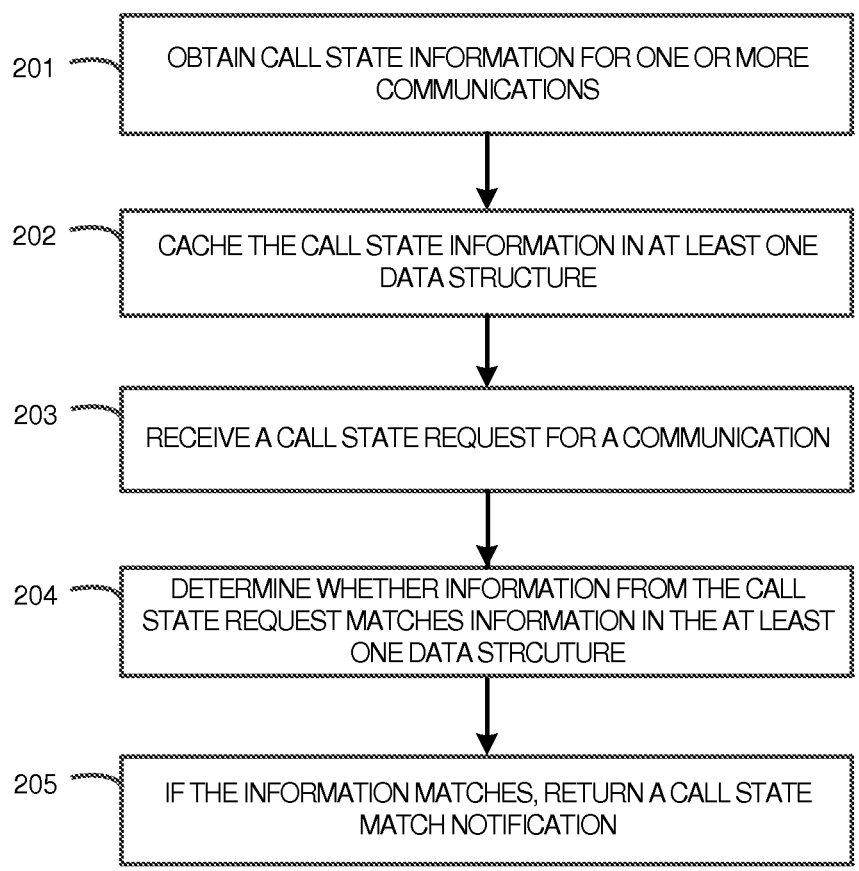
FIG. 2 illustrates a method of verifying communications over a wireless network to an end contact service.

FIG. 2 illustrates a method of verifying communications over a wireless network to an end contact service. FIG. 2 is representative of a method that can be employed in communication system 100, although other systems may employ similar operations.

As described herein, wireless network 120 permits WCDs 110-112 to make data and voice communications with various devices and services. In particular, wireless network 120 allows WCDs 110-112 to communicate with contact service 130, using a TFN, telephone number, or some other communication identifier. In addition to providing the communication, wireless network 120 may identify or flag each of the communications that are initiated with contact service 130. Once the communications are flagged, call state service 140 obtains call state information for the communications from WCDs 110-112 (201), and stores or caches the call state information in at least one data structure (202). The call state information may include identifiers or telephone numbers associated with the wireless device, identifiers or numbers associated with the contact service, the time of the communication, the duration of the communication, or some other call state data. The call state information may be stored within a table, a tree, a linked list, or any other similar data structure capable of managing and organizing the call state information for the communications from the wireless devices. In some implementations, call state service 140 may maintain information about communications to contact service 130 that occurred over a defined time period. For example, call state cache 145 may be used to store call state information for communications over the last thirty minutes, hour, or any other defined time period.

As the data is collected and maintained in call state service 140, call state service 140 receives a call state request for a communication or call (203). This call state request may be initiated by contact service 130 or by any other system associated with a particular destination phone system. In response to the request, call state service 140 determines whether information from the call state request matches information for a communication stored in call state cache 145 (204). For example, contact service 130 may initiate a request for a call that was received at contact service 130, wherein the request includes the TFN or other identifier used for contact service 130, the number of the device that communicated with contact service 130, and any other similar information for a call received at contact service 130. Once the request is received with the call state information, the information is then compared to the information in call state cache 145 to determine if the call received by contact service 130 corresponds to a communication that was initiated over wireless network 120.

If the information in the request matches a communication that was cached within call state cache 145, call state service 140 may return a call state match notification to contact service 130 (205). This notification provides contact service 130 with a verification that the call is genuine from a wireless device on wireless network 120. However, if it is determined that the call state information in the request does not match a call that is stored within call state cache 145, a notification may be returned to contact service 130 indicating that a record for the call can not be found within the network. This notification may allow contact service 130 to terminate the call and, in some examples, identify further information about the source of the improper communication.

In some implementations, contact service 130 may receive communications from devices over multiple wireless networks provided by multiple wireless service providers. Consequently, rather than querying a single call state service corresponding to a single service provider, contact service 130 may be required to request call state matching information from the various service providers. The requests to the service providers may occur in parallel, may occur using a series of requests to identify the validity of the communication, or may occur in any other similar manner. Accordingly, if three networks were capable of communicating with contact service 130, two or more of the networks may return that a match does not exist to a communication query.

In some implementations, in response to identifying that a match does not exist in call state cache 145, call state service 140 may then request and receive roaming information from wireless network 120. In particular, contact service 130 may receive a communication associated with a telephone number for a device. In response to the communication, contact service 130 may request call state service 140 to verify the communication. If call state service 140 is incapable of identifying the communication, call state service 140 may query one or more systems within wireless network 120 to determine whether the device is roaming on another wireless service provider network. If an alternative network is identified for the device, wireless network 120 returns an identifier for the alternative network to call state service 140, allowing call state service 140 to return the alternative network information to contact service 130. Based on the response by call state service 140, contact service 130 may request and receive the call state information for the device from the alternative network. In contrast, if a roaming network cannot be identified by wireless network 120, call state service 140 may notify contact service 130 that no record can be found of the particular wireless device transferring to another network. This may trigger contact service 130 to identify that the received communication is an illegitimate communication.

Figure 3:
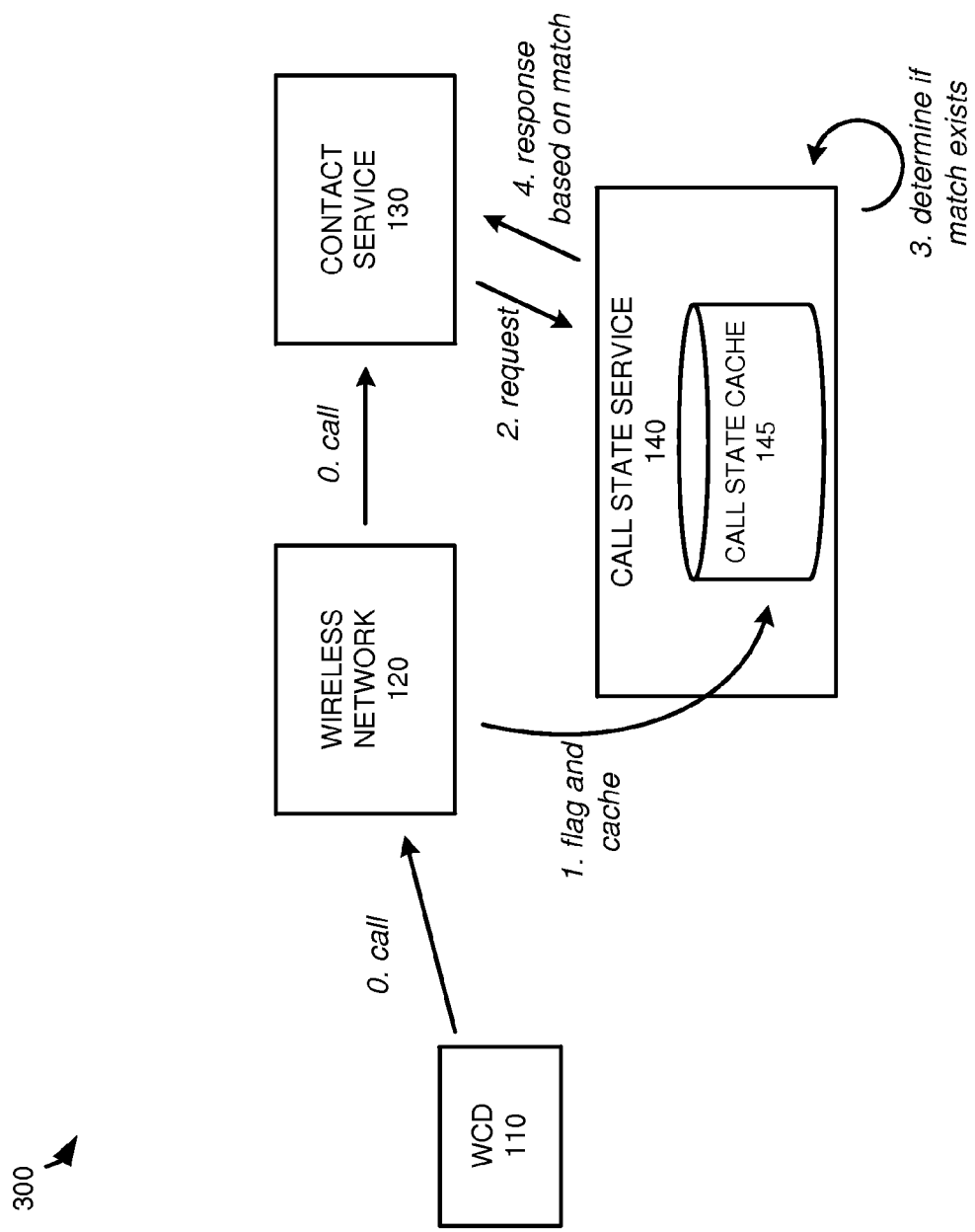
FIG. 3 illustrates an operational scenario of verifying a call based on call state information.
Figure 4:
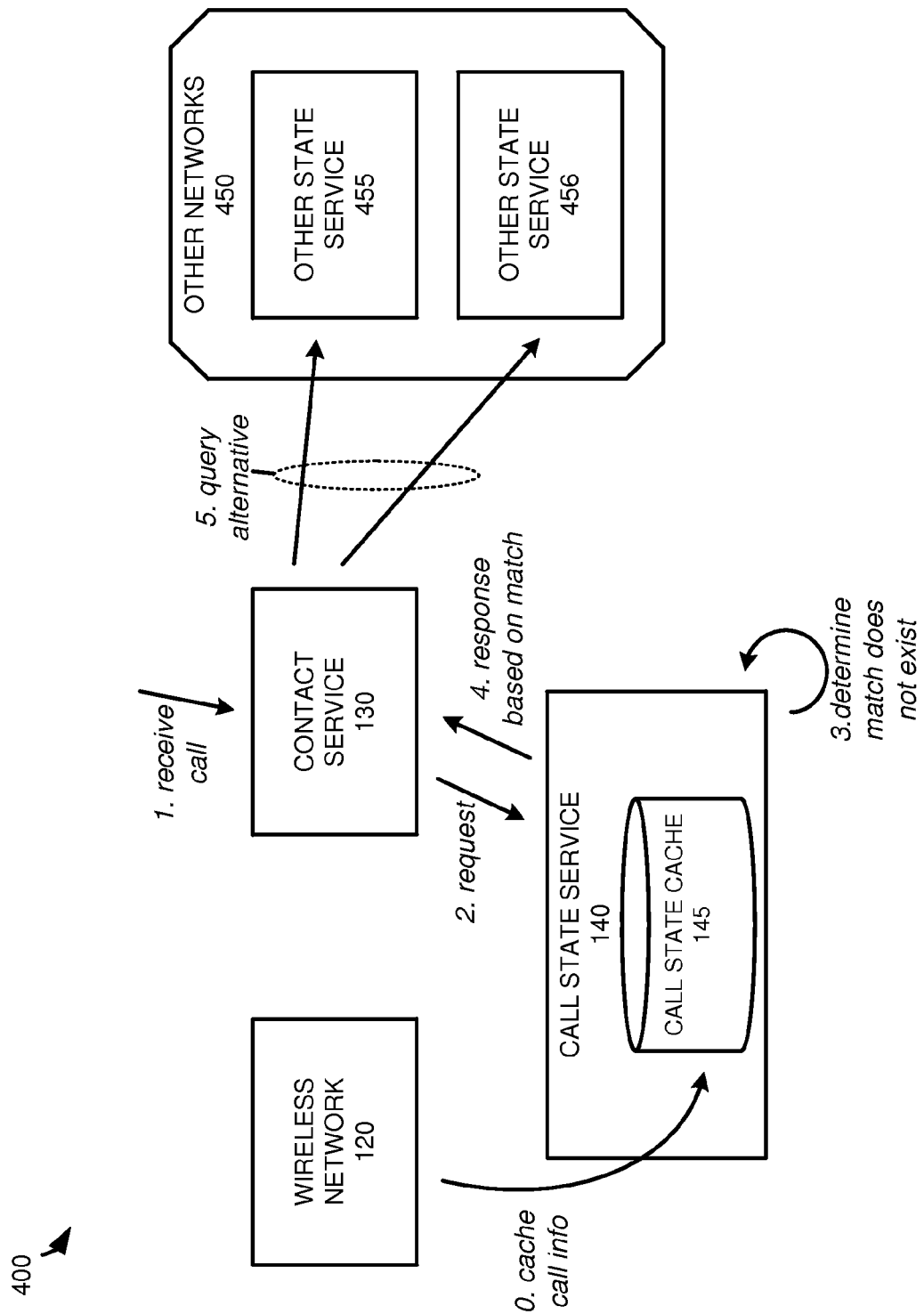
FIG. 4 illustrates an operational scenario of notifying a contact service about a current call status.
Figure 5:
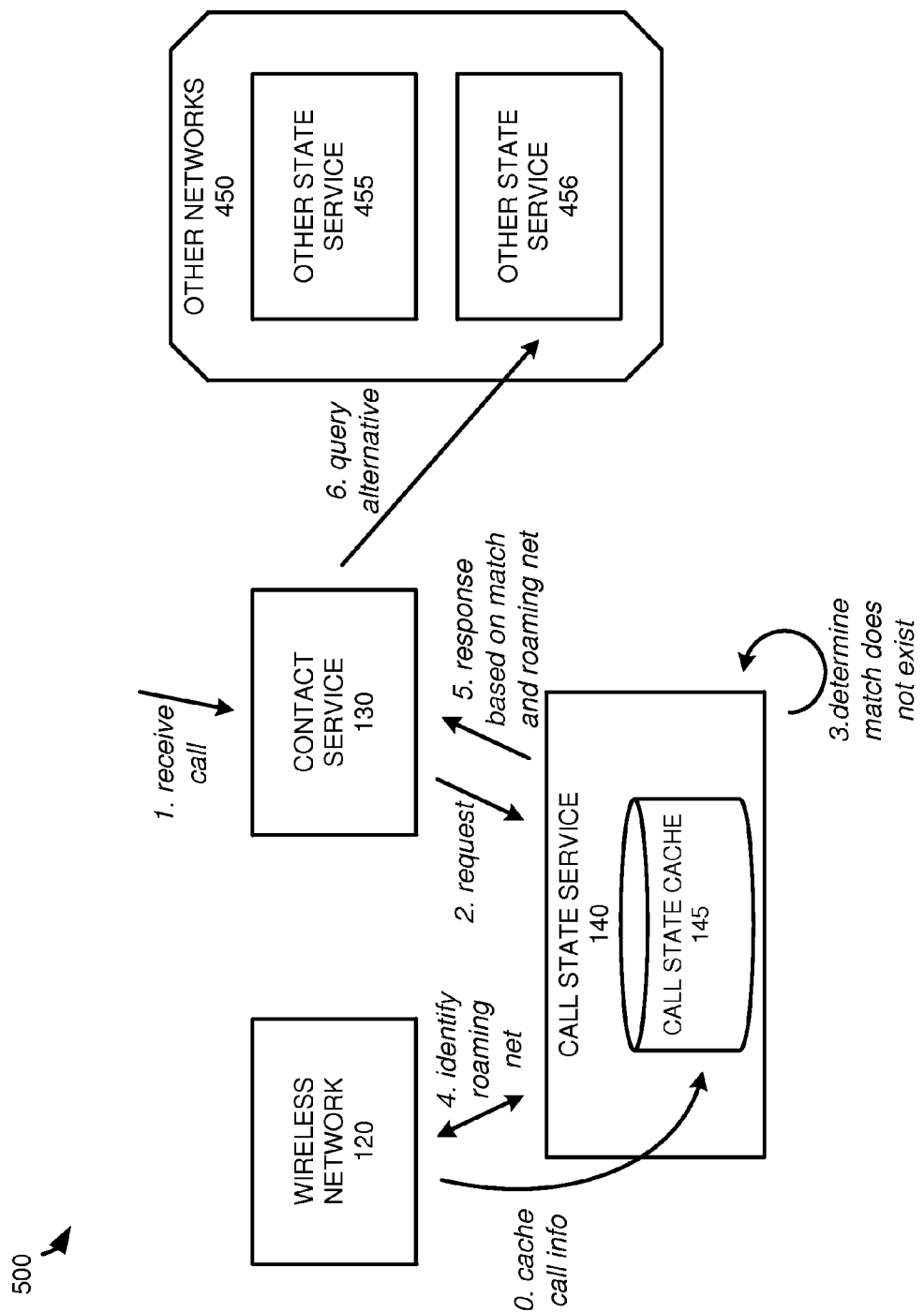
FIG. 5 illustrates an operational scenario of notifying a contact service about a current call status.

Referring now to FIGS. 3-5, FIGS. 3-5 demonstrate operational scenarios for operating a call state service to provide information about current call statuses. In particular, FIG. 3 illustrates an operational scenario 300 of verifying a call based on call state information. FIG. 3 is illustrated using the systems and devices of communication system 100 from FIG. 1. FIG. 3 includes WCD 110, wireless network 120, contact service 130, and call state service 140.

In operation, a call is initiated by WCD 110 for contact service 130. As the communication passes through wireless network 120, wireless network 120 may flag or identify the destination of the call and provide call state information to call state service 140. Call state service 140 caches the call state information for the call from WCD 110 in call state cache 145, wherein the call state data may include identifier or number information for WCD 110, identifier or phone number for contact service 130, a time of the call, and record of the duration of the call, amongst other possible information.

Once the call state information is stored for WCD 110 along with the call state information for any number of other calls from other devices, contact service 130 may initiate a request to call state service 140 to determine the validity of the call from WCD 110. This request may include call state information for the call as it was received at contact service 130, including the source of the call, the number or identifier of contact service 130, or any other similar information. Based on the information provided in the request from contact service 130, call state service 140 may determine if a match exists between the call identified at contact service 130 and the call recorded in call state cache 145.

In some implementations, as described herein, the call state information may be stored in one or more data structures that can be searched using the information provided in the request. Accordingly, if the information in the request matches an entry for a call identified across wireless network 120, such as the example illustrated in FIG. 3, a notification may be provided to contact service 130 indicating that a call match was identified. Based on the call match notification, contact service 130 may permit the call to continue as it is verified from a user device. In contrast, if the call were not identified by call state service 140, the call may be blocked or terminated at contact service 130 because the call is from an impersonated device.

FIG. 4 illustrates an operational scenario 400 of notifying a contact service about a current call status. Operational scenario 400 is illustrated using the systems and devices of communication system 100 from FIG. 1 and further includes other state services 455-456 associated with other networks 450. Other state services 455-456 are examples of call state systems that are associated with other wireless networks and service providers.

In the present example, wireless network 120 is configured to provide call state information to call state service 140, wherein the call state information may include identifier information for communicating wireless devices, identifier information for the contact service contacted by the wireless devices, the time of the call, the duration of the call and the like. In some implementations, flags may be set related to particular numbers contacted by the wireless devices. For example, an administrator or management service related to contact service 130 may include a flag to cache all call state information for calls that are initiated with a telephone number associated with contact service 130. Accordingly, any call to the number associated with contact service 130 may be flagged across wireless network 120, whereas any call that is not to the flagged number will not be flagged or identified across wireless network 120.

As the call state information is obtained by call state service 140, call state service 140 may cache the call state data into one or more data structures represented by call state cache 145. These data structures may include tables, linked lists, data trees, or any other data structure capable of managing the call state information for the wireless network. As the data is being stored in call state cache 145, contact service 130 receives a call that must be verified before it is processed by contact service 130. To verify the communication, contact service 130 may query call state service 140 to determine if the call was made over wireless network 120. In some implementations, an application programming interface (API) may be configured, allowing contact service 130 to contact and retrieve information about a specific communication.

In response to receiving the request, call state service 140 determines whether a match exists between the call identified in the request from contact service 130 and a call stored within call state cache 145. Here, call state service 140 determines that a match does not exist between the calls, and provides a notification that the call cannot be found to contact service 130. In some implementations, to determine whether the call is identified within call state cache 145, call state service 140 may compare parameter provided in the request from contact service 130. These parameters or call state information identified by contact service 130 may include source identifier information for the calling device, identifier or phone number information for contact service 130, or any other similar information. The information for the call received by contact service 130 is then compared to the call state data for the calls in the cache to make a determination on whether the call occurred over wireless network.

In the present implementation, once a response is received by contact service 130, indicating that a match could not be found for the incoming call, contact service 130 then queries alternative roaming carriers to determine if the call occurred on their network. In particular, although the call may not be identified by call state service 140, in some examples, the call may have occurred on other service provider network 450. Consequently, to validate the device, contact service may query other state services 455-456, which correspond to call state services on other networks, to determine whether the call is legitimate. If one of the networks identifies the call, then contact service 130 may continue with processing of the communication. In contrast, if the call cannot be identified by other state services 455-456, contact service 130 may prevent future processing of the communication, and provide further investigation into the origin of the call.

FIG. 5 illustrates an operational scenario 500 of notifying a contact service about a current call status. Operational scenario 500 is illustrated using the systems and devices of communication system 100 from FIG. 1, and further includes other state services 455-456 associated with other networks 450 from FIG. 4. Other state services 455-456 are examples of call state services for other wireless service providers.

Similar to the operations described above with respect to FIG. 4, call state service 140 maintains call state information for communications placed over wireless network 120. This call state information may be maintained for specific TFNs over a defined time period, such as the last ten minutes, hour, or some other time period. As the data is maintained by call state service 140, contact service 130 identifies a call associated with particular parameters. In response to the call, contact service 130 generates a request to call state service 140 to determine if the call is from a legitimate wireless device, or if the call is "spoofed" from a device in the network. Once the request is received by call state service 140, call state service 140 determines whether a match exists between the call received at contact service 130 and the calls maintained in call state cache 145. If a match does exist, call state service 140 reports the match to contact service 130, allowing contact service 130 to continue processing of the call. In contrast, if a match is not identified from the call state information in call state cache 145, which is illustrated in FIG. 5, call state service 140 may query wireless network 120 to determine a roaming network for the wireless device associated with the call.

In particular, wireless network 120 may maintain information about which networks a device is using outside of the home network. For example, if the device required a transition from a home wireless network to a second wireless network, the home wireless network may record information about which service provider is handling the transferred device. This information may be recorded in the network switching subsystem or some other similar system within the wireless network. Accordingly, call state service 140 may query the network switching subsystem to determine roaming information related to a telephone identifier and receive, from wireless network 120, information about the roaming of the device. Once the information is received from the wireless network a response may be provided to contact service 130 indicating whether a match was identified for the received call and the roaming information related to the call.

Referring still to the example in FIG. 5, call state service 140 identifies that a match is not available for the call received at contact service 130, and further identifies that the wireless device related to the call received at contact service 130 transitioned to communicating with a wireless provider network associated with other state service 456. Once the response is transferred from call state service 140 to contact service 130, contact service 130 may then query other state service 456 to determine whether the related device initiated the received call. If a record of the call is identified in other state service 456, then contact service 130 may continue processing the received call. However, if other state service 456 does not identify a record of the call from the cached call state data contact service 130 may terminate the call, limiting the amount of resources that are provided to the "spoofed" communication.

In some implementations, wireless network 120 may fail to identify any record that a roaming transition occurred for the wireless device. Accordingly, if no record were identified within call state cache 145, and no record were identified for the device roaming to another network provider, call state service 140 may respond to the request of contact service 130 indicating that no authorized call occurred. Based on this response, contact service 130 will not be required to contact other state services to determine whether the device initiated the communication from a roaming network.

FIG. 6 illustrates a call status data structure 600 to maintain call state information for a wireless network. Call status data structure 600 includes device identifiers 610, contact identifiers 620. Call status data structure 600 is an example data structure that can be employed in call state service 140 to provide caching of call state information for the communications across a wireless network, although other data structure examples may exist. Although illustrated as a table in the present example, it should be understood that the caching data structure might comprise a data tree, a linked list, or some other data structure capable of caching information about flagged components.

As described herein, wireless devices may communicate over a wireless network to communicate with various end services. These end services or contact services are often associated with a telephone number that allows multiple devices to communicate with the end service at any one time. However, although multiple real devices may communicate with the service, voice over internet protocol (VOIP) has allowed other devices to spoof or impersonate calls from a real device. Here, call status data structure 600 is an example data structure that can be employed by a call state service to manage the call states for communications to specific end services. In some implementations, flags or triggers may be defined within a wireless network to maintain call state information for communications to specific telephone or toll free numbers. These flags may be generated by an administrator of the wireless network, by users associated with the telephone numbers, or by some other function associated with the wireless network. Here, the relevant telephone or toll free numbers are represented by contact identifiers 620. Accordingly, any time that a device initiates a communication over the network to a contact identifier of contact identifiers 620, the communication will be flagged to monitor the call state information.

In the present example, when a communication is flagged from the device, the call state service maintains information on the device identifiers 610 that are associated with the communication, as well as call time 630 that are associated with the communication. Specifically, device identifiers 610 refer to telephone numbers, caller identification names, or other similar identifiers that are associated with the wireless device. Further, call times 630 maintains information about the time that the communication was initiated between each of the devices and the end service. Although illustrated with three columns/categories in the present example for the call state information, it should be understood that any number of columns might be introduced in the data structure to compare calls identified by the end service to calls placed over the network.

As an illustrative example, a toll free number service receives a call from a particular phone number. In response to receiving the call, the toll free number service requests validation information from a call state service associated with a wireless provider network. This request may include an identifier for the calling device, such as the devices phone number, may include an identifier for the end contact service, such as the toll free number associated with the service, a time that the call was received by the service, and may include any other similar information about the received communication. Based on the content of the request, the request may then be compared to calls stored in call status data structure 600. Accordingly, if a match existed between the information from the request, and a row consisting of a device identifier in device identifiers 610, a contact identifier in contact identifiers 620, and a call time in call times 630, a response will be provided to the end service that the call is valid. In contrast, if a match were not identified, a response may be provided, indicating that a call record could not be located.

In some implementations, in addition to searching a data structure, such as call status data structure 600, the call state service may also request and receive information about the roaming status of the device associated with the call to the end service. In particular, many wireless networks may manage information about the roaming status of devices that communicate over the network. Accordingly, when a wireless network requires a transition to another network, the home wireless network may maintain information about what network the device was transitioned to. Once the roaming information is received by the call state service, the roaming information may be included in the response to the end service allowing the end service to inquire other call state services associated with the roaming network.

Figure 7:
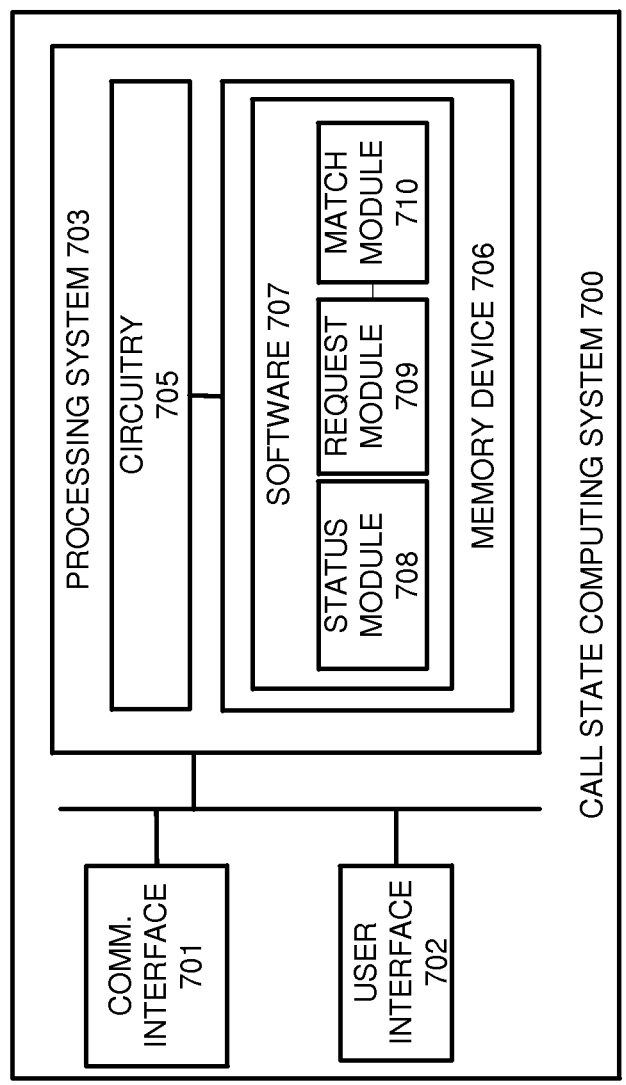
FIG. 7 illustrates a call state computing system to manage call state information for a wireless network.

FIG. 7 illustrates a call state computing system 700 to manage call state information for a wireless network. Call state computing system 700 is representative of any computing system or systems with which the various operational architectures, processes, scenarios, and sequences disclosed herein for a call state service may be implemented. Call state computing system 700 is an example of call state service 140, although other examples may exist. Call state computing system 700 comprises communication interface 701, user interface 702, and processing system 703. Processing system 703 is linked to communication interface 701 and user interface 702. Processing system 703 includes processing circuitry 705 and memory device 706 that stores operating software 707. Call state computing system 700 may include other well-known components such as a battery and enclosure that are not shown for clarity. Computing system 700 may be a personal computer, server, or some other computing apparatus—including combinations thereof.

Communication interface 701 comprises components that communicate over communication links, such as network cards, ports, radio frequency (RF) transceivers, processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In particular, communication interface 701 communicates with at least one element of a wireless network, such as a gateway, router, or some other network element that can provide information about calls over the networks. Further, communication interface 701 may communicate with an end service, such as a toll free service, or some other service that would request the validity of communications.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes status module 708, request module 709, and match module 710, although any number of software modules may provide the same operation. Operating software 707 may further include an operating system, utilities, drivers, network interfaces, applications, or some other type of software. When executed by processing circuitry 705, operating software 707 directs processing system 703 to operate call state computing system 700 as described herein.

In particular, status module 708 directs processing system 703 to obtain call state information for phone calls made over a wireless provider network. This call state information may include a source identifier or telephone number for the wireless device, a destination identifier or telephone number associated with the contacted end service, a time stamp for when the call occurred or any other similar information. In some implementations, call state computing system 700 may monitor communications over the wireless provider network to identify relevant communications that are to be monitored. For example, computing system 700 may be configured by an administrator of the wireless network, a user or administrator associated with an end service, or some other process to monitor communications to particular end service telephone numbers. In other implementations to obtain the call state information, the wireless provider network may only provide information regarding communications to particular end services. Accordingly, rather than monitoring each of the communications over the network, call state computing system 700 may only receive call state information for communications to particular end services.

As the call state information is obtained by call state computing system 700, status module 708 directs processing system 703 to store the information into one or more data structures. These data structures may comprise tables, linked lists, data trees, or some other type of data structure capable of managing the data for the individual communications. Once the information is stored, request module 709 directs processing system 703 to identify a request to match a communication that was identified by one of the end service providers. As described herein, it may be desirable for end service providers, such as toll free number services, to ensure that communications to the service are verified prior to processing the call. To verify a communication, a request may be generated that provides information about the received call including source identifier information for the received call and an identifier for the end service. After the request is received at call state computing system 700, match module 710 determines if there is a match between the communication information provided in the request and the call state information stored in the one or more data structures. For example, a toll free number service may provide a telephone number for a received call and an identifier associated with the toll free number service. In response to receiving the request, call state computing system 700 may match the communication information provided in the request to a communication entry in the data structure. If a match is identified, match module 710 may direct processing system 703 to generate and provide a response to the requesting service indicating that the call is verified. In contrast, if a match cannot be located within the data structure, match module 710 directs processing system 703 to generate and provide a response to the requesting service indicating that the call is not verified.

In some implementations, software 707 may further direct processing system 703 to determine roaming information for a device when a communication match could not be identified in the one or more data structures. To determine roaming information, call state computing system 700 may contact the home subscriber server or some other similar element of the wireless network to determine if a number identified as communicating with the end service has transitioned to communicating on another network. If the device has not transitioned to another network, computing system 700 may notify the requesting end service that the call from the device is fraudulent. However, if the device is roaming on another network, then computing system 700 may provide roaming information to the request end service. The end service may then contact a call state system associated with the roaming network to determine if the call was initiated on the network.

Returning to the elements of FIG. 1, WCDs 110-112 each comprise Radio Frequency (RF) communication circuitry and an antenna. The RF communication circuitry typically includes an amplifier, filter, modulator, and signal processing circuitry. WCDs 110-112 may each also include a user interface, memory device, software, processing circuitry, or some other communication components. WCDs 110-112 may each comprise a telephone, computer, e-book, mobile Internet appliance, wireless network interface card, media player, game console, or some other wireless communication apparatus, including combinations thereof.

Wireless network 120 comprises network elements that provide communication services to WCDs 110-112. Wireless network 120 may comprise switches, wireless access nodes, Internet routers, network gateways, application servers, computer systems, communication links, or some other type of communication equipment—including combinations thereof. Wireless network 120 may comprise a Long Term Evolution (LTE) network, a third generation wireless network, or some other wireless network for a wireless service provider.

Contact service 130 is representative of an end communication service, such as a toll free number termination point, or some other end service communication point. Contact service 130 may include one or more communication devices, servers, gateways, call routers, or other similar computing systems capable of receiving calls from wireless devices.

Call state service 140 comprises one or more computing systems capable of managing call state information for calls placed over wireless network 120. Call state service 140 may include one or more processing systems, storage systems, communication interfaces, user interfaces, or other similar computing systems. Call state service 140 may comprise one or more serving computing devices, desktop computing devices, switches, or other similar computing systems, including combinations thereof.

Wireless signaling 183 includes wireless links that use the air or space as transport media, and communicate with WCDs 110-112 using LTE, third generation wireless formats, or some other wireless communication format. Communication links 180-182 could use various communication protocols, such as Time Division Multiplex (TDM), Internet Protocol (IP), Ethernet, communication signaling, wireless communication signaling, or some other communication format—including combinations thereof. Communication links 180-182 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a call state service to manage call state information for a wireless provider network, the method comprising:
    obtaining the call state information from a wireless network for one or more communications initiated by wireless communication devices on the wireless network:
    storing the call state information in at least one data structure, wherein the call state information for each communication comprises at least an identifier for a wireless communication device that initiated the communication and a destination identifier for the communication;
    receiving a call state request for a communication of interest from a contact service, wherein the communication of interest comprises a received communication by the contact service;
    identifying relevant call state information for the communication of interest;
    determining whether the relevant call state information for the communication of interest matches a communication in the one or more communications based on the at least one data structure;
    if the relevant call state information for the communication of interest matches a communication in the one or more communications, returning a call state match notification to the contact service;
    if the relevant call state information for the communication of interest fails to match a communication in the one or more communications, transferring a roaming request for roaming network information from a wireless provider network associated with the call state service, receiving, from the wireless provider network, the roaming network information and returning a call state match failed notification and the roaming network information to the contact service.

2. The method of claim 1 further comprising identifying one or more relevant phone numbers associated with the contact service, and wherein obtaining the call state information for the one or more communications comprises obtaining the call state information for the one or more communications directed to the one or more relevant phone numbers.

3. The method of claim 2 wherein identifying the one or more relevant phone numbers associated with the contact service comprises receiving a user-defined configuration that provides the one or more relevant phone numbers.

4. The method of claim 1 wherein the identifier for the wireless communication device that initiated the communication comprises a source telephone number associated with the wireless communication device that initiated the communication, and wherein the destination identifier for the communication comprises a destination telephone number.

5. The method of claim 1 wherein the contact service comprises a service associated with a toll free number.

6. The method of claim 1 further comprising, if the relevant call state information for the communication of interest fails to match a communication in the one or more communications, returning a call state match failed notification.

7. An apparatus to manage call state information for a wireless provider network, the apparatus comprising:
    one or more non-transitory computer readable media; and
    processing instructions stored on the one or more non-transitory computer readable media that, when executed by a processing system, direct the processing system to:
    obtain the call state information from a wireless network for one or more communications initiated by wireless communication devices on the wireless network;
    store the call state information in at least one data structure, wherein the call state information for each communication comprises at least an identifier for a wireless communication device that initiated the communication and a destination identifier for the communication;
    receive a call state request for a communication of interest from a contact service, wherein the communication of interest comprises a received call by the contact service;
    identify relevant call state information for the communication of interest based on the call state request;
    determine whether the relevant call state information for the communication of interest matches a communication in the one or more communications based on the at least one data structure;
    if the relevant call state information for the communication of interest matches a communication in the one or more communications, return a call state match notification to the contact service; and
    if the relevant call state information for the communication of interest fails to match a communication in the one or more communications, transfer a roaming request for roaming network information from a wireless provider network associated with the call state service; receiving, from the wireless provider network, the roaming network information; and returning a call state match failed notification and the roaming network information to the contact service.

8. The apparatus of claim 7 wherein the processing instructions further direct the processing system to identify one or more relevant phone numbers associated with the contact service, and wherein the processing instructions to obtain the call state information for the one or more communications direct the processing system to obtain the call state information for the one or more communication directed to the one or more relevant phone numbers.

9. The apparatus of claim 8 wherein the processing instructions to identify the one or more relevant phone numbers associated with the contact service direct the processing system to receive a user-defined configuration that provides the one or more relevant phone numbers.

10. The apparatus of claim 7 wherein the identifier for the wireless communication device that initiated the communication comprises a source telephone number associated with the wireless communication device that initiated the communication, and wherein the destination identifier for the communication comprises a destination telephone number.

11. The apparatus of claim 7 wherein the contact service comprises a service associated with a toll free number.

12. The apparatus of claim 7 wherein the processing instructions further direct the processing system to, if the relevant call state information for the communication of interest fails to match a communication in the one or more communications, return a call state match failed notification.

13. A method of operating a call state service to manage call state information for a contact service, the method comprising:

obtaining a configuration, wherein the configuration comprises one or more telephone numbers associated with the contact service;

obtaining the call state information for one or more communications over a wireless provider network to the one or more telephone numbers, wherein the call state information for each communication comprises at least an identifier for a wireless communication device that initiated the communication;

receiving a call state request for a communication of interest from the contact service, wherein the communication of interest comprises a received communication by the contact service;

identifying relevant call state information for the communication of interest based on the call state request;

determining whether the relevant call state information for the communication of interest matches a communication in the one or more communications based on the at least one data structure;

if the relevant call state information for the communication of interest matches a communication in the one or more communications, return a call state match notification to the contact service; and if the relevant call state information for the communication of interest fails to match a communication in the one or more communications, transferring a roaming request for roaming network information from a wireless network associated with the call state service, receiving, from the wireless network, the roaming network information, and returning a call state match failed notification and the roaming network information to the contact service.

14. The method of claim 13 further comprising, if the relevant call state information for the communication of interest fails to match a communication in the one or more communications, returning a call state match failed notification.

15. The method of claim 13 wherein the call state information comprises at least a destination telephone number and a source telephone number.

\* \* \* \* \*